(12) United States Patent
Kim et al.

(10) Patent No.: US 6,306,222 B1
(45) Date of Patent: Oct. 23, 2001

(54) PROCESS FOR CLEANING PLASTICS FOR RECYCLING THEM

(75) Inventors: In-Bok Kim; Sung-In Hong, both of Taejeon; Ik-Soo Kim, Kyungki-do; Joong-Seok Noh, Seoul, all of (KR)

(73) Assignee: LG-Caltex Oil Corporation (KR)

( * ) Notice: Subject to any disclaimer, the term of this patent is extended or adjusted under 35 U.S.C. 154(b) by 0 days.

(21) Appl. No.: 09/580,988

(22) Filed: May 30, 2000

(30) Foreign Application Priority Data

Mar. 14, 2000 (KR) ............................................. 2000-12704

(51) Int. Cl.$^7$ ....................................................... B08B 3/00
(52) U.S. Cl. ........................... 134/26; 134/16; 134/22.19; 134/30; 134/34; 134/35; 134/36; 134/37; 134/42; 521/40; 521/40.5; 521/41; 521/44.5; 521/46; 521/46.5; 521/47; 521/47.5; 521/48; 521/49; 528/480; 241/20; 241/24.1; 241/24.11; 241/24.18; 241/24.28
(58) Field of Search .............................. 521/40, 40.5, 41, 521/44.5, 46, 46.5, 47, 47.5, 48, 49; 528/480; 241/20, 24.1, 24.11, 24.18, 24.28; 134/16, 22.19, 26, 30, 34, 35, 36, 37, 42

(56) References Cited

U.S. PATENT DOCUMENTS

| | | | |
|---|---|---|---|
| 3,843,060 | * | 10/1974 | Colburn ............................... 241/24 |
| 4,092,458 | * | 5/1978 | Hoffman .............................. 428/402 |
| 4,855,081 | * | 8/1989 | Wallace ............................... 252/626 |
| 5,207,929 | * | 5/1993 | Sung et al. .......................... 210/774 |
| 5,423,133 | * | 6/1995 | Annen et al. ......................... 34/585 |
| 5,554,657 | * | 9/1996 | Brownscombe et al. ............. 521/48 |
| 5,780,520 | * | 7/1998 | Reeves et al. ...................... 521/48.5 |
| 5,824,709 | * | 10/1998 | Zuka ..................................... 521/47 |
| 5,899,392 | * | 5/1999 | Hayward et al. ..................... 241/17 |
| 6,114,401 | * | 9/2000 | Doonan ................................. 521/40 |

* cited by examiner

Primary Examiner—Sharidan Carrillo
(74) Attorney, Agent, or Firm—Woodcock Washburn Kurtz Mackiewicz & Norris LLP

(57) ABSTRACT

A process for cleaning plastic materials is disclosed, in which foreign materials adhered on and internally intruded into the plastic materials are cleaned to recycle the plastic materials. The process for cleaning plastics to recycle them according to the present invention includes the following steps. (1) A first cleaning is carried out on roughly crushed plastics of a size of 2–3 cm by using a solvent within a dumbler. (2) The solvent is discharged out of the dumbler after the first cleaning. (3) A second cleaning is carried out on the plastics by using a solvent within the dumbler after the first cleaning. (4) The solvent is discharged out of the dumbler after the second cleaning. (5) The plastics are dried after the second cleaning by injecting a heated nitrogen gas into the dumbler. (6) The nitrogen gas is discharged out of the dumbler under a reduced pressure, whereby contamination materials adhered on surfaces and internally intruded are cleaned.

4 Claims, 1 Drawing Sheet

PROCESS FOR CLEANING PLASTICS FOR RECYCLING THEM

FIELD OF THE INVENTION

The present invention relates to a process for cleaning plastic materials, in which foreign materials adhered on the plastic materials are cleaned to recycle the plastic materials. More specifically, the present invention relates to a process for cleaning plastic materials, in which the plastic articles such as plastic containers for containing lubricants are cleaned to recycle the waste plastics.

BACKGROUND OF THE INVENTION

As the demand for plastic materials has increased, efforts have been made to recycle the plastics. Particularly, waste plastics are buried into the ground, or incinerated, but these methods cause soil contamination and air pollution. Accordingly, recently, researches to recycle them have been carried out to such a degree that some methods have attained to a practical stage.

Plastics are very much diversified in their kinds, and different recycling methods have to be employed for different kinds. Among the plastic articles, the plastic containers which contain lubricants are very difficult to recycle. These kinds of plastic containers are contaminated with a high viscosity lubricant component and, therefore, it is difficult to remove the contamination materials. If the temperature is raised to regenerate them, then foul toxic odors are typically generated. Accordingly, so far, a limited amount of waste lubricant containers has been regenerated into low quality products, while the rest of them has been buried or incinerated.

Generally, lubricant contains petroleum substance and additives. The additives contain phenols, zinc compounds, sulphur and its compounds, and calcium/magnesium compounds. All these substances are the causes of contaminations. Lubricants are usually packed in the amount of 2 L, 4 L, and 6 L. The lubricant containers have been mostly buried or incinerated as described above. The lubricant containers are made of polypropylene (PP), or a high density polyethylene (HDPE).

SUMMARY OF THE INVENTION

The present inventor developed a process for easily removing high viscosity contamination materials such as lubricants, so that waste plastics such as lubricant containers can be recycled. The process of the present invention is capable of removing not only lubricant but also other general high viscosity contamination materials.

Therefore, it is an object of the present invention to provide a process for cleaning plastics to recycle them, in which a solvent suitable for removing high viscosity contamination materials such as lubricant is developed to clean the plastics.

It is another object of the present invention to provide a process for cleaning plastics to recycle them, in which not only the surface contamination materials but also the internally intruded contamination materials can be cleaned.

It is still another object of the present invention to provide a process for cleaning plastics to recycle them, in which after a use at a first cleaning step, the solvent is regenerated to reuse it, and the solvent of a second cleaning step recycled to the first cleaning step, thereby minimizing the discharge amount of the contaminating materials.

It is still another object of the present invention to provide a process for cleaning plastics to recycle them, in which after cleaning the waste plastics twice, the cleaned plastics are dried by circulating a heated nitrogen gas, and in this procedure, the used nitrogen is recirculated to save the expense.

It is still another object of the present invention to provide a process for cleaning plastics to recycle them, in which the foreign materials adhered on the plastics in the form of a film are removed by using a cyclone, thereby completely removing the contamination materials.

The above objects and other objects can be achieved by the present invention as described below.

In order to accomplish the above objects, the process for cleaning plastics to recycle them according to the present invention includes the steps of: (1) carrying out a first cleaning on roughly crushed plastics of a size of 2–3 cm by using a solvent within a tumbler; (2) discharging the solvent out of the tumbler after the first cleaning; (3) carrying out a second cleaning on the plastics by using a solvent within the tumbler after the first cleaning; (4) discharging the solvent out of the tumbler after the second cleaning; (5) drying the plastics after the second cleaning by injecting a heated nitrogen gas into the tumbler; and (6) discharging the nitrogen gas out of the tumbler under a reduced pressure, whereby contamination materials adhered on surfaces and internally intruded are cleaned.

In the present invention, the solvent which is discharged after the first cleaning is called "black solvent", and the solvent which is discharged after the second cleaning is called "yellow solvent". The yellow solvent is recycled to the first cleaning stage. The black solvent which has been discharged at the first cleaning undergoes a regenerating process to be regenerated into a clean solvent. This clean solvent is recycled to the second cleaning stage.

When the second cleaning for the plastics is completed, a heated nitrogen gas is circulated into the tumbler to dry the cleaned plastics. Under this condition, the nitrogen gas is circulated again and again, and if a shortage of the nitrogen occurs, then the shortage is compensated by injecting nitrogen from the outside. If the drying step is completed, the internal gas is discharged under a reduced pressure. Under this condition, the contamination materials adhered on the surface of the plastics and internally intruded contamination materials are discharged in a gaseous form. On the surface of the plastics, there are attached foreign materials such as label films, and these kinds of foreign materials are removed by using a cyclone, thereby improving the purity of the cleaned plastics.

BRIEF DESCRIPTION OF THE DRAWINGS

The above objects and other advantages of the present invention will become more apparent by describing in detail the preferred embodiment of the present invention with reference to the attached drawing in which.

DETAILED DESCRIPTION OF THE PREFERRED EMBODIMENT

Figure 1:
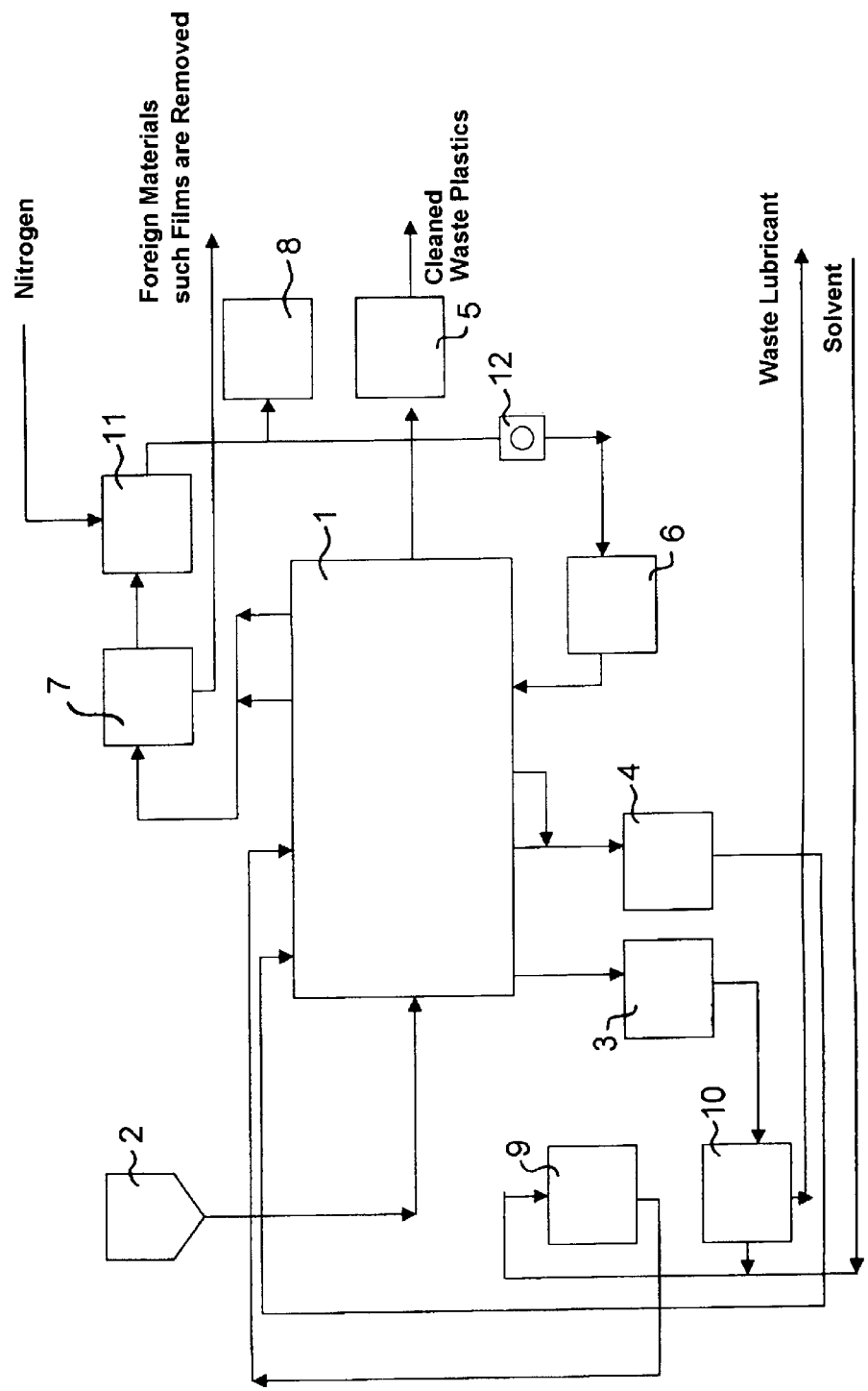
FIG. 1 is a block diagram showing the constitution of the process for cleaning the plastics to recycle them according to the present invention.

The preferred embodiment of the present invention will be described referring to the attached drawing.

FIG. 1 is a block diagram showing the constitution of the process for cleaning the plastics to recycle them according to the present invention.

In order to clean the plastics according to the present invention, first the plastic material has to be roughly crushed into pieces of 2–3 cm. Here, the crushing is carried out to facilitate the cleaning of the lubricant containers, but when burying them, they are also crushed.

The roughly crushed plastic pieces are put through a hopper 2 into a tumbler 1. When the plastic pieces are charged to a certain height within the tumbler 1, a solvent is supplied from a solvent tank 4 into the tumbler to carry out a first cleaning on the plastic pieces. Under this condition, the tumbler rotates by 90–150 degrees to clean the plastic pieces. The rotations of the tumbler is realized by a motor (not illustrated), and this function can be easily carried out by those ordinarily skilled in the art. The operation time period of the tumbler can be set by an external controller (not illustrated).

When the first cleaning is completed, the used solvent is discharged to store it in a dirty solvent tank 3. This dirty solvent is regenerated into a clean solvent 9 by going through a regenerating procedure at a regenerating tower 10. Under this condition, the residual materials which cannot be regenerated are dispositioned as waste lubricant.

When the first cleaning is completed, the clean solvent which has been stored in a clean solvent tank 9 is injected into the tumbler 1 to carry out a second cleaning. The second cleaning is carried out in the same manner as that of the first cleaning. If a shortage of the solvent occurs, the shortage is filled from the outside.

The solvent which has carried out the second cleaning is discharged and stored in solvent tank 4. This solvent is used again to carry out the first cleaning.

If the second cleaning is completed, a nitrogen gas which has been heated by a heater 6 is supplied into the tumbler 1 to dry the plastic pieces which are filled in the tumbler. The nitrogen gas which has dried the plastic pieces within the tumbler is circulated by a blower 12, and under this condition, if a nitrogen shortage occurs, nitrogen is supplemented from the outside. The temperature of the nitrogen gas is decided by the kinds of the plastics, and is usually 80–120 degrees C. This can be easily carried out by those ordinarily skilled in the art. For example, if the plastic material is PP, the temperature of the nitrogen gas is maintained at about 120 degrees C., while in the case of HDPE, the temperature of the nitrogen gas is maintained at about 100 degrees C.

During the time when the drying is being carried out, a cyclone 7 is activated to remove the foreign materials which are internally intruded into the plastic material. The plastic material may include the foreign materials such as label film or the like, and this can be efficiently removed by the cyclone 7, thereby improving the purity of the regenerated plastics. The nitrogen gas which is discharged out of the cyclone 7 is transferred through a knock-out drum 11 to the blower 12.

If the drying is completed, the gas within the tumbler 1 is discharged to the outside. This process step is continued until the internal pressure is lowered to 10–100 torr by using a vacuum device 8. Thus the internal gas of the tumbler 1 is discharged by the vacuum device 8, and the gaseous-phase contamination materials and the internally intruded residual contamination materials (by being gasified) are discharged to the outside. Accordingly, in the present invention, even the internally intruded contamination materials can be removed by applying the vacuum discharge process. The tumbler 1 is rotated to an angle of 90–150 degrees when the drying and vacuum discharging are carried out, thereby maximizing the drying efficiency.

Upon completion of the vacuum discharge process step, the rotation of the tumbler 1 is terminated, and the dried plastic pieces are transferred to a fine crushing machine 5. In this fine crushing machine, the cleaned plastic pieces are crushed to a size of 0.5 mm or less, and these finely crushed plastic particles are directly used, or used after undergoing an extrusion at an extruder (not illustrated).

In the present invention, the solvent has to vaporize high viscosity contamination materials such as lubricant during the drying step, and therefore the solvent should preferably contain aromatic and paraffin components which have a drying point of 100–190 degrees C. The mixing ratio of paraffin and aromatic compounds should be preferably 1:99–99:1. As the aromatic compound, toluene and benzene are possible, but in view of the handlability, toluene is preferred. The most preferable solvent is one in which the mixing ratio of the paraffin and toluene is 50:50.

In the present invention, the internally intruded contamination materials are removed to the maximum, and therefore, when the regenerated plastic material is formed into a product, the toxic odor can be eliminated.

The present invention can be more thoroughly understood by the actual example which is presented below. This actual example is just an example, and is not intended to limit the scope of the present invention.

EXAMPLE

In order to clean a contaminated polypropylene plastic container, it was roughly crushed into pieces of 2–3 cm. The roughly crushed plastic pieces were filled through a hopper into a tumbler to initiate a cleaning step. A solvent was injected into the tumbler to a certain level, and upon reaching the relevant level, the tumbler was laterally agitated for 15 minutes to clean the plastic pieces. Then the dirty solvent thus formed was discharged to a certain level, and then, all the dirty solvent was discharged. Then a clean solvent was injected into the tumbler and the tumbler was laterally agitated. During this agitation, the solvent was partially discharged while supplementing the amount of the solvent. In this manner, the height of the solvent was maintained at a constant level, and in this state, the agitation was carried out for 15 minutes. Then the supplementing of the solvent was stopped, and the total amount of the solvent within the tumbler was discharged. Then the lateral agitation of the tumbler was continued for five minutes, thereupon terminating the cleaning step.

Then a nitrogen gas which has been heated by a heater to 120 degrees C was supplied through the bottom of the tumbler into the tumbler, in such a manner that the nitrogen gas can escape through the top of the tumbler. In this manner, the plastic pieces were dried by maintaining the temperature of the plastic pieces at a certain level. The foreign materials such as film were removed by the cyclone. The nitrogen gas was circulated to a cooler to be cooled, and then was circulated to the heater to be heated. The heated gas was supplied into the tumbler again, and this procedure was repeatedly carried out. This procedure was continued for an hour or more, then the residual solvent and contamination materials were vaporized for 10 minutes under a vacuum pressure of 10–100 torr, and then, were discharged to the outside.

The cleaned plastic pieces were transferred from the tumbler to a fine crushing machine, and were finely crushed to a size of 0.5 mm or less. Then the finely crushed plastic particles were packed for selling.

Measurements of Properties of the Regenerated Resin and the Conventional PP Resin:

The properties were measured on the regenerated plastic of the example of the present invention and a conventional PP resin, and the measurement results are shown in Table 1 below.

TABLE 1

| Properties | Example | Conventional PP |
|---|---|---|
| Melt index (g/10 min) (1) | 0.37 | 1.39 |
| Ethylene (%) | 12.8 | 12.1 |
| Contraction rate (%) | 1.58 | N.A. |
| Tensile strength (Kg/sqr cm) (2) | 252 | 264 |
| Elongation (%)(3) | 570 | 500 up |
| Deflection elasticity (Kg/sqr cm) (3) | 10.340 | 10.237 |
| IZOD (Kg.cm/cm, 23 deg C.) (4) | 77.5 | 68.7 |
| (Kg.cm/cm, −10 deg C.) | 7.7 | 7.1 |
| HDT (degrees C.) (5) | 95.9 | 98.7 |
| Rockwell hardness (R scale) | 61.8 | 59.6 |
| Gardner impact (Kg.cm) | 215 | 198 |

Note:
(1) measured based on ASTM D-1238.
(2) measured based on ASTM D-638.
(3) measured based on ASTM D-790.
(4) measured based on ASTM D-256.
(5) measured based on ASTM D-648.

According to the present invention as described above, a solvent which is suitable for removing high viscosity contamination materials is developed to clean surface contamination materials and internally intruded contamination materials. The solvent is recycled after first and second cleaning, and a nitrogen gas is recirculated again and again during the drying process step. In this manner, the expense can be curtailed, and the environmental contamination can be prevented. Further, a cyclone is used at the drying step, thereby easily removing the foreign materials from the plastics.

In the above, the present invention was described based on the specific preferred embodiment and the attached drawing, but it should be apparent to those ordinarily skilled in the art that various changes and modifications can be added without departing from the spirit and scope of the present invention which will be defined in the appended claims.

What is claimed is:

1. A process for cleaning waste plastics from plastic petroleum lubricant containers, comprising the steps of:
preparing roughly crushed plastic pieces of a size of 2–3 cm from plastic petroleum lubricant containers;
cleaning the roughly crushed plastic pieces by using a solvent consisting of a paraffin and an aromatic compound within a tumbler, wherein said aromatic compound is selected from the group consisting of toluene and benzene;
discharging the solvent out of said tumbler after the cleaning;
drying the plastic pieces by injecting a heated nitrogen gas into the tumbler; and
discharging the nitrogen gas out of the tumbler under a reduced pressure of 10~100 torr.

2. The process as claimed in claim 1, further comprising the step of removing foreign materials by a cyclone during the drying step.

3. The process as claimed in claim 1, wherein said aromatic compound is toluene.

4. The process as claimed in claim 3, wherein the ratio of said paraffin to said toluene is 50:50.

* * * * *

UNITED STATES PATENT AND TRADEMARK OFFICE
CERTIFICATE OF CORRECTION

Page 1 of 1

PATENT NO. : 6,306,222 B1
DATED : October 23, 2001
INVENTOR(S) : In-Bok Kim; Sung-In Hong; Ik-Soo Kim and Joong-Seok Noh It is certified that error appears in the above-identified patent and that said Letters Patent is hereby corrected as shown below:

<u>Title page,</u>
Item [57], ABSTRACT,
All six (6) occurrence of "dumbler" should read -- tumbler --

Signed and Sealed this

Nineteenth Day of March, 2002

Attest:

Attesting Officer

JAMES E. ROGAN
Director of the United States Patent and Trademark Office